INVENTOR
J. A. HACKETT
BY
R. C. Winter
ATTORNEY

INVENTOR
J. A. HACKETT
BY
R. C. Winter
ATTORNEY

INVENTOR
J. A. HACKETT
BY
R. C. Winter
ATTORNEY

United States Patent Office 3,204,040
Patented Aug. 31, 1965

3,204,040
SWITCHING CIRCUIT
John A. Hackett, Old Bridge, N.J., assignor to Bell Telephone Laboratories, Incorporated, New York, N.Y., a corporation of New York
Filed Dec. 29, 1961, Ser. No. 163,261
14 Claims. (Cl. 179—18)

Figure 1:
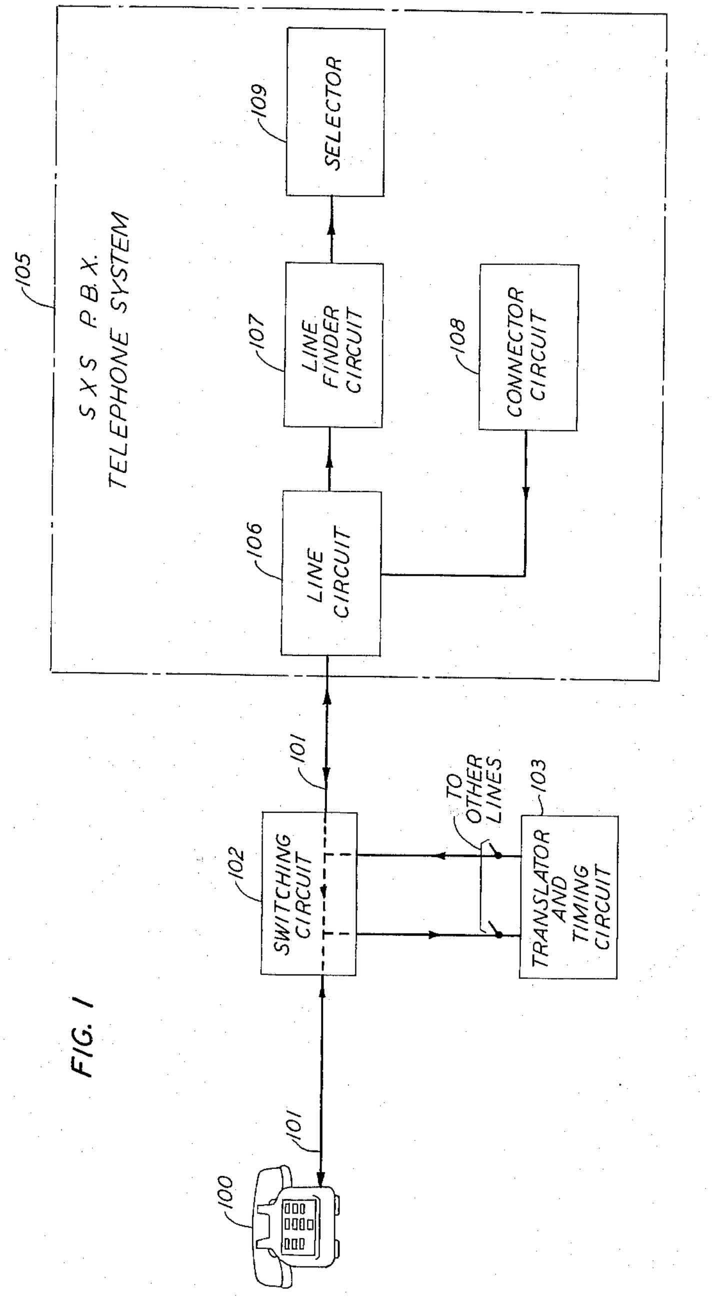

This invention relates generally to switching equipment in an automatic telephone system, and particularly to switching equipment which causes the interposition of a translating device between a subset and an automatic telephone system.

For a number of years, telephone switchboards have been equipped with multifrequency signaling pushbutton sets, rather than with the conventional dial pulse sigaling sets used on most telephones. Pushbutton sets are easy to manipulate, and it is possible to place a call more rapidly with a pushbutton set than with a conventional dial. The consequent reduction in time is not only advantageous from a customer's standpoint in that it reduces the time to place a call, but it is also advantageous from a telephone system standpoint in that expensive central office equipment is held operated for shorter periods of time.

In order to bring the advantages of pushbutton sets to existing telephones, it is of course necessary to provide central office equipment which is capable of recognizing and registering multifrequency signaling information. The transition in an existing telephone system from dial pulse signaling to multifrequency, pushbutton signaling for all telephones could not be achieved instantaneously; therefore, a need arose to provide translators, also commonly called converters, responsive to both dial pulse signaling and multifrequency signaling. This need was met by the arrangement disclosed in F. C. Kuchas patent 3,133,155 issued May 12, 1964. The disclosure provides the conversion feature on a common control basis as is the proper expedient in central offices involving a large number of subscribers.

Since then, it has become increasingly apparent that this conversion technique should also be made available in a telephone systems serving relatively few subscribers, such as automatic Private Branch Exchanges (PBX's). Electronic PBX's, which provide telephones with pushbutton facilities, further increase the need to expand the use of this service in existing PBX's from a marketing standpoint, in order to display the advantages of such equipment in its natural environment. It has also been recognized in the past that pushbutton signaling may be provided as a premium service for which a customer pays a small extra charge. In this event the two types of telephone subsets may coexist in a telephone system for an extended period.

The well-known principle of common control has as its object the sharing of certain complex equipment rather than providing it on a per line basis at a consequent increase in cost. However, certain other necessary associated equipment to permit access to this complex equipment is usually of itself relatively expensive and relatively large since of necessity it is designed for a high rate of usage by a large number of lines.

In the case at hand where comparatively few subscribers are involved and in many instances for a brief interval, coupled with the fact that at such locations equipment mounting space is often at a premium, the use of full common control equipment cannot economically be justified. Since translators capable of changing multifrequency signals to corresponding dial pulse signals are well known in the art, the provision of switching equipment which would function on a semicommon-control basis would meet the need in PBX's or the like which involve relatively few subscribers.

In a view of the foregoing, a general object of this invention is to make it possible to provide pushbutton subscriber facilities in a telephone system requiring this service on a limited basis.

Another object is to permit a multifrequency to dial pulse translator to be shared by a plurality of lines, each line comprising a simple and compact switching arrangement which permits the service to be provided economically.

A further object is to permit the use of pushbutton facilities in a telephone system, the size of which would make it economically unfeasible to provide full common control facilities.

These and other objects of the invention are attained in accordance with an exemplarly embodiment wherein equipment is provided in the line between the subset at the customer's location and the line circuit at the PBX. This equipment consists of three relays, the first of which is in series with one side of the line. This first relay, polarized by a diode in parallel with its operating winding, distinguishes between a call originating at the subset, and therefore requiring a translator, and a call which is being terminated at the subset and, hence, is handled in the conventional manner. The second relay, under control of the first relay and the calling subset, causes the seizure of the translator which is common to many such lines as determined by traffic. The third relay provides the supervisory function of releasing the entire circuit in case of an abandoned call before seizure of a translator, an interdigital timeout, or a postdigital timeout, as indicated by a timing circuit associated with the translator.

In the normally released state of the switching circuit, the continuity of the line is affected only by the operating winding of the first relay. Therefore, a conductor placed in parallel with this winding will disable the entire switching circuit and render the line suitable for use by conventional dial pulsing apparatus.

In accordance with one feature of my invention, a switching circuit comprising three relays and associated apparatus is arranged to interpose a translator between a multifrequency signal generating subset and a dial pulse responsive central office.

In accordance with another feature of my invention, the switching circuit includes apparatus arranged to interpose the translator between the multifrequency signal generating subset and the dial pulse responsive central office only on calls originating from the subset. More particularly, this apparatus consists of a first relay of the switching circuit polarized by a diode in parallel with its operating winding.

In accordance with a further feature of my invention, the switching circuit includes apparatus which is arranged to cause delay of the transmission of dial tone, originating at the central office, to the subset until a translator has been interposed between the subset and the central office. More particularly, this apparatus includes the first relay and a second relay of the switching circuit.

In accordance with still another feature of my invention, the switching circuit may be converted for use by a conventional dial pulse generating subset merely by bypassing the first relay winding.

Figures 2, 4:
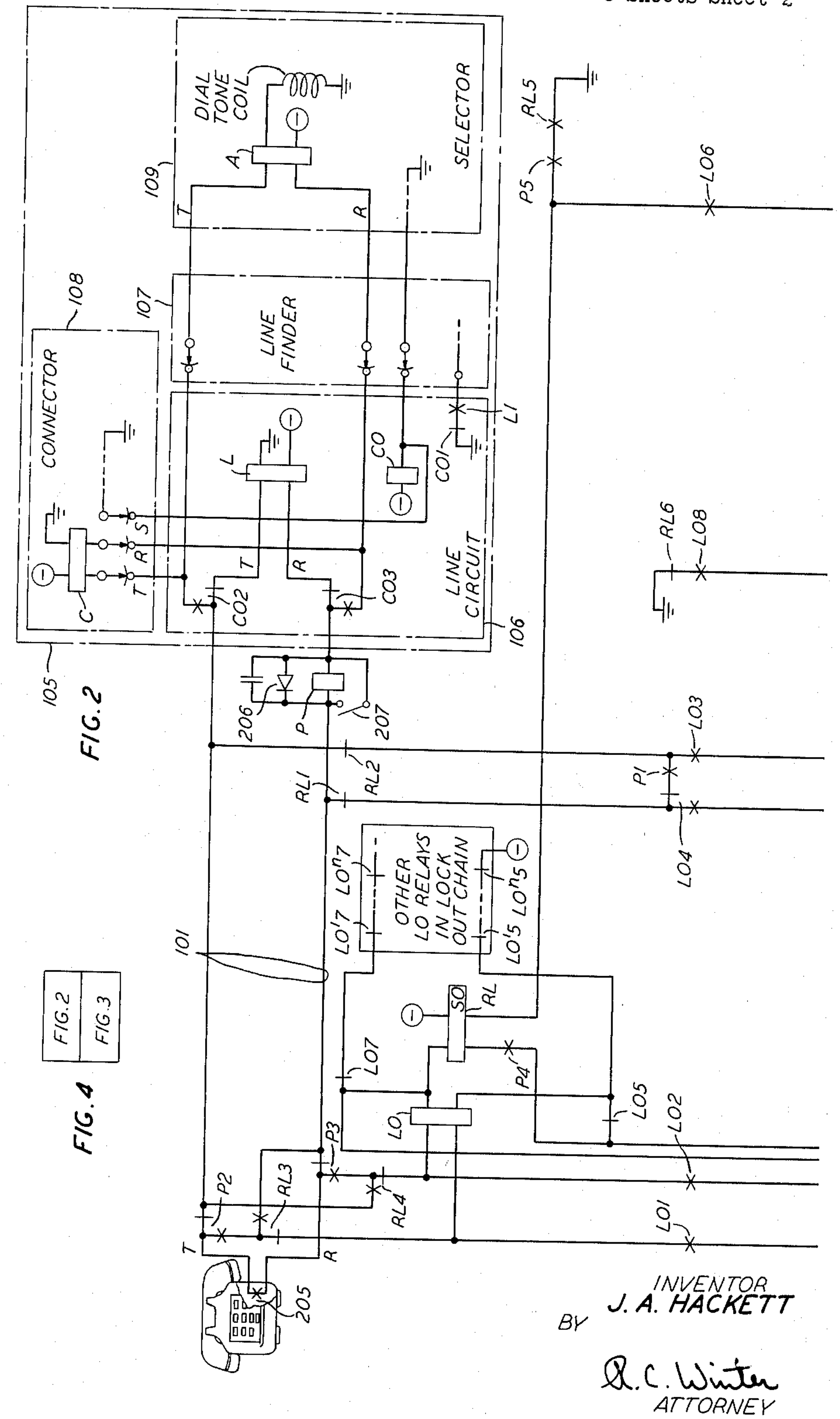
Figure 3:
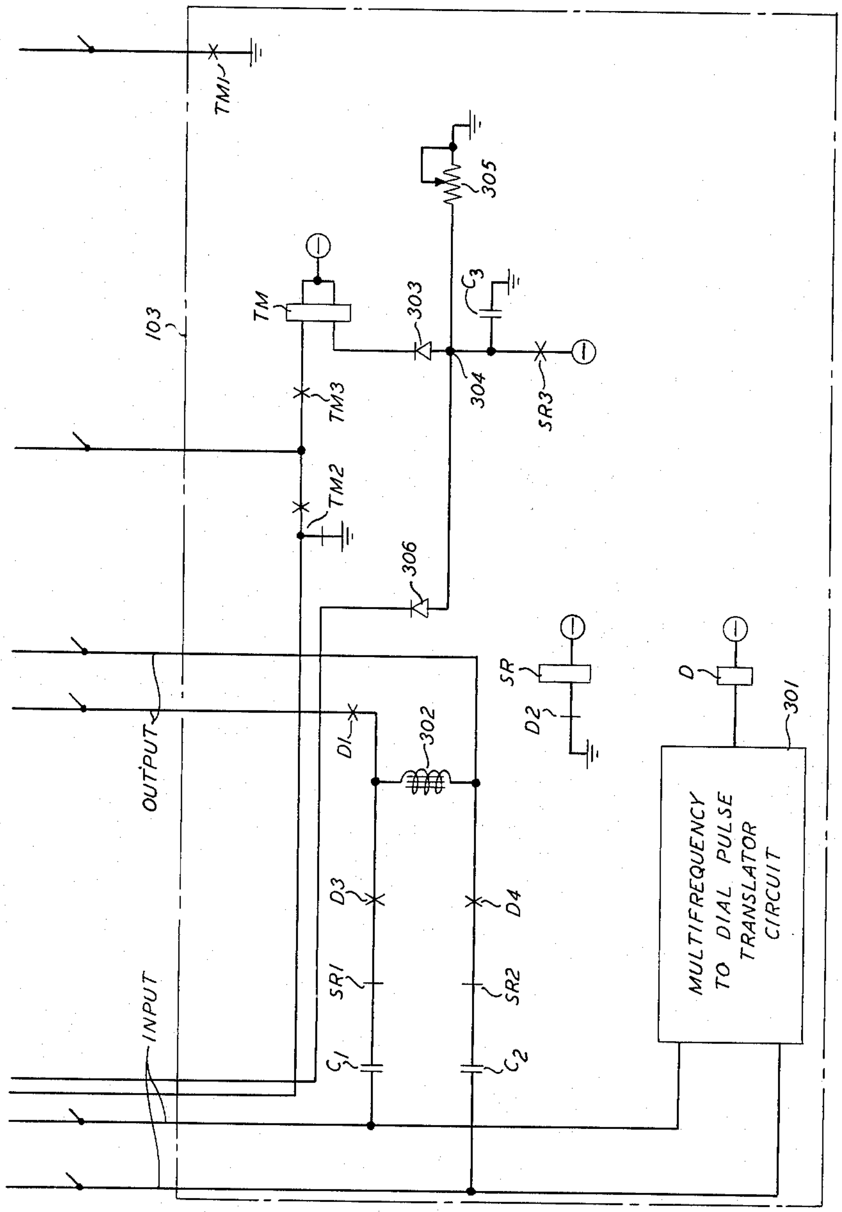

The foregoing objects and features, as well as others, of this invention will be more apparent from a consideration of the subsequent description and the drawing in which:

FIG. 1 is essentially a block diagram showing the relative position of each of the circuits of the embodiment;

FIGS. 2 and 3 contain a schematic representation of the embodiment depicted in FIG. 1 showing the interconnection of the switching circuit, the subset, the translator and associated timing circuit, and the PBX; and FIG. 4 is a key chart for the proper arrangement of FIGS. 2 and 3.

It will be noted that FIGS. 2 and 3 employ a type of notation referred to as "detached contact" in which an "*x*" represents a normally open contact of a relay, and a single bar represents a normally closed contact of a relay; "normally" referring to the unoperated condition of the relay. The principles of this type of notation are described in an article entitled "An Improved Detached-Contact-Type of Schematic Circuit Drawing" by F. T. Meyer, in the September, 1955 publication of American Institute of Electrical Engineers Transactions Communications and Electronics vol. 74, pages 505–513.

The invention as disclosed herein is embodied in a switching circuit 102, FIG. 1, for interposing a multifrequency to dial pulse translator in the line 101 between a multifrequency generating subset 100 and a dial pulse responsive PBX 105. It is particularly concerned with relays P, LO, RL and associated equipment of FIG. 2. The other circuit components shown in FIG. 1, including the multifrequency pushbutton set 100, translator and timing circuit 103 and the step-by-step (SxS) PBX 105 comprising line circuit 106, line finder circuit 107, the connector circuit 108, and the selector circuit 109 are neither shown nor described in detail herein except where necessary for a complete understanding of the invention.

The interrelation and function of equipment units of the exemplary embodiment will now be described with reference to FIG. 1, wherein the interconnections between circuit blocks have been designated by means of arrows to show the direction of circuit action. A multifrequency pushbutton subset 100 is shown connected, through switching circuit 102 by line 101, to its line circuit 106 in SxS PBX telephone system 105. The line circuit 106 is shown associated with line finder circuit 107 for purposes of originating calls in the well-known manner and also associated with connector circuit 108 for purposes of terminating calls in the well-known manner. The conventional translator and timing circuit 103 is shown; the timing circuit providing a signal if the over-all functioning interval or interdigital interval of translator 103 exceeds a preset amount as will be described more fully hereinafter. Translator 103 is shown associated with switching circuit 102, which controls the interposing of translator 103 in the line 101 on calls originating from subset 100.

Reference will now be made to FIGS. 2 and 3 in order to describe in detail the invention as portrayed in the illustrative embodiment.

In order to facilitate the presentation of the detailed disclosure, the circuit description has been subdivided as follows:

(I) Call Originating at Subset
(II) Call Terminating at Subset
(III) Abandoned Call
(IV) Functioning of Timing Circuit (I) *Call originating at subset*

When the receiver is removed from the switchhook at subset 100, FIG. 2, line relay L in station line circuit 106 operates from ground through its upper winding, the T conductor of the line 101, operated switchhook contacts 205, the R conductor of loop 101 and the operate winding of relay P to battery on the lower winding of relay L. The operation of line relay L closes make contact L1 in line circuit 106 to provide ground from break contact CO1 of cutoff relay CO to cause line finder 107 to hunt for this line and to provide dial tone in the conventional manner from the selector 109.

The closure of switchhook contacts 205 also completes a path to cause the operation of relay P whose operating winding, in the R conductor of the line 101, is thus placed in series with the windings of line relay L. Relay P operates and completes a holding path for itself through operated make contact P1, thereby also maintaining a closed loop toward the PBX to keep line relay L energized. The operation of relay P also switches the T and R conductors of line loop 101 from subset 100 to relay LO, through operated transfer contacts P2 and P3.

One of the functions of relay LO is to cause the seizure of translator 301 in translator and timing circuit 103, FIG. 3, when the translator 301 is available. Therefore, relay LO is wired in a conventional lockout chain with the relays of other subscriber lines which have the same function. If another circuit has its comparable relay LO operated, this circuit will wait. Otherwise relay LO will operate from ground through normal transfer contacts TM2, FIG. 3, the upper winding of relay LO, operated transfer contact P3, switchhook contact 205 and operated transfer contact P2, to battery provided on the lower winding of relay LO through the released chain of break contacts $LO^15$ and $LO^n5$ of the lockout chain.

The operation of relay LO extends the T and R leads from subset 100 to the input of the translator and timing circuit 103 through operated make contacts LO1 and LO2, respectively. Relay LO also extends the T and R leads from the PBX to the output of translator and timing circuit 103 through the operated contacts LO3 and LO4, respectively. The holding path for relay P, as well as the closed loop toward the central office is thus placed under control of make contact D1, FIG. 3, of normally operated translator relay D which completes the D.C. path from the PBX through inductor 302.

The successful finding of the line 101 by line finder 107 causes the operation of relay CO in line circuit 106 from ground in the associated selector 109. Relay CO releases relay L by opening the line 101 at operated transfer contacts CO2 and CO3. Relay CO also extends the closed loop from the output of translator and timing circuits 103 to relay A of selector 109 through operated transfer contacts CO2 and CO3. The windings of relay A impart the same polarity to the T and R leads as previously provided by relay L. Dial tone is returned to translator 301 through operated contacts D3 and D4 and capacitors $C_1$ and $C_2$, FIG. 3, and thus to subset 100 to indicate that multifrequency pulsing may begin over the T and R conductors to the input of the translator and timing circuit 103.

Contact D1 of relay D operates and releases in response to the output of the translator 301 as manifested by the pulsing of relay D to cause corresponding openings and closures of the loop toward the PBX in the well-known manner. The initial release of relay D on the first pulse causes the operation of relay SR, FIG. 3, which opens the dial tone path to subset 100 by means of break contacts SR1 and SR2. Relay SR being slow release holds over the ensuing dial pulses. Relay P also holds over pulsing by virtue of diode 206 in parallel with its winding which imparts a slow release characteristic to the relay. The pulsing of relay D continues in translated response to the signals generated by subset 100 and controls the setting of the switches in the PBX in the usual manner.

The SxS PBX 105 inherently provides a reversal of polarity on the T and R leads when the called party answers to indicate that the connection has been established. This reversal of polarity is utilized to release relay P in FIG. 2 which is polarized by diode 206 in parallel with its winding. Diode 206 shunts the winding of relay P in response to the reversal which places a positive potential on conductor R with respect to a negative potential on conductor T. The release of relay P extends the T and R conductors from subset 100 through released transfer contacts P2 and P3 to the BX. The release of transfer contacts P2 and 3 also opens the operate path of relay LO thereby releasing translator 103 for use by other lines.

If the called party fails to answer within a predetermined interval, the translator is released by the timing circuit as will be described subsequently.

In the event that subscriber line 101 should be required for use by a conventional subset employing dial pulse transmitting apparatus, the closure of switch 207 will disable the switching circuit and render the line suitable for such use. Thus, with relay P bypassed, dial tone would be returned in the conventional manner and dial pulses generated by the subset would be transmitted directly to PBX 105.

(II) *Call terminating at subset*

When the line 101 is seized for a terminating call through connector 108, ground on the S lead is connected to relay CO in line circuit 106. The operation of relay CO extends the T and R leads through the windings of connector relay C via transfer contacts CO2 and CO3, respectively. Thus, the polarity of the T lead of the line 101 is negative with respect to the R lead. Relay P, shunted by diode 206 for such polarity, does not operate as described hereinbefore. The connection is established straight through to subset 100 and ringing takes place in the conventional manner.

(III) *Abandoned calls*

The calling party may abandon the call prior to the seizure of the translator 103, i.e., after relay P has operated but before relay LO operates. In this situation relay RL, FIG. 2, will operate from ground through normal transfer contacts TM2, FIG. 3, operated make contact P4 and normal break contact LO5 to negative battery. The operation of relay RL interrupts the continuity of the T and R leads of line 101 toward the PBX 105 by means of its operated RL1 and RL2 break contacts thereby releasing relay P. The operated relay RL also opens the connection of the T and R leads from the subset 100 to the windings of relay LO via operated transfer contacts RL3 and RL4. The release of relay P opens the operate path of relay RL, restoring the circuit to normal.

Relay RL has been selected to be slow operate to insure that it does not operate falsely indicating an abandoned call prior to the normal operation of relay LO.

(IV) *Functioning of the timing circuit*

A timing circuit is provided with translator 301 to insure that one calling party does not tie up the translator 301 for more than a predetermined interval. The timing cycle is begun on the initial seizure of the translator 301 and at the end of each outpulsed digit. A timeout is signaled by relay TM, FIG. 3, the operation of which will be described in detail subsequently. Relay TM, when operated, supplies ground through make contact TM1 and operated make contact LO6 to operate relay RL, FIG. 2. Relay RL locks to ground through make contacts P6 and RL5.

The operation of relay RL opens the operate path of relay LO at transfer contacts RL3 and RL4, releasing translator 301. Relays RL and P then remain operated under control of the closed loop to subset 100 until the calling party hangs up, at which point the circuit returns to normal. Thus, in the case of an interdigital timeout, the calling party will recognize from the absence of audible ringing tone that the connection has not been established and will re-establish the call. In the case of timeout induced by the called party not answering promptly, the connection remains straight through to PBX 105 and the calling party hears audible ringing tone in the usual manner until the called party answers.

The lower winding of relay TM, FIG. 3, is in series with a PNPN diode 303 which is normally biased by negative battery at point 304 through diode 306 and the chain of released break contacts of the LO relays, thereby keeping relay TM in a released condition. The operation of one of the LO relays removes this negative potential permitting the negative charge with respect to ground existing across capacitor $C_3$ at point 304 to discharge through resistor 305 to positive ground. Point 304 thus approaches a positive potential with respect to the negative potential impressed on the lower winding of relay TM.

If contact SR3 does not close in response to relay SR operating, as described hereinbefore, to indicate that pulsing has begun from the subset, then relay TM will operate to indicate timeout. The operate time of relay TM is determined by the value of capacitor $C_3$ and the setting of resistor 305 in conjunction with the characteristic conducting voltage of PNPN diode 303.

Assuming that relay SR is operated sufficiently soon to re-establish the bias on diode 303, then the operation of relay TM will be under control of relay SR. Relay SR being slow release will hold over the pulses manifested by contact D2 of relay D in the operate path of relay SR. However, the release of relay SR in the interdigital interval will again remove the bias from diode 303 to permit a time out indication should this interval exceed the predetermined value.

The operation of relay RL, as described before, opens the locking path from ground through contacts RL6 and LO8 via the upper winding of relay TM, releasing the relay. The initial operation of operated transfer contacts TM2 removes the normally supplied ground to the LO relay chain, thereby insuring that a subsequent LO relay of another circuit does not operate before translator and timing circuit 103 has restored to normal.

While the equipments of this invention have been described with reference to a particular embodiment in an arrangement for interposing a multifrequency to dial pulse translator between a multifrequency generating subset and a dial pulse responsive PBX, it is to be understood that such an embodiment is intended to be illustrative of the principles of the invention and that numerous other arrangements may be devised by those skilled in the art without departing from the spirit and scope of the invention.

For example, the invention could be arranged to operate in conjunction with subscriber equipment transmitting other types of signaling to which an associated PBX or central office is not responsive. It could be utilized also with switchboard trunks terminating in switching equipment which is not responsive to the type of signaling provided at an operator's position. In addition, the invention may readily be modified to operate with data transmitting or receiving apparatus arranged to transmit or receive a type of signaling different from that which is provided at a central office.

What is claimed is:

1. In a telephone system, a switching office responsive to direct current signals, a subset, a line circuit located at said switching office, a line connecting said subset to said line circuit, means in said subset for applying alternating current signals to said line, translating means for converting said alternating current signals to corresponding direct current signals, means in said subset operable to indicate a request for service to said switching office, first means operative in response to a signal from said switching office to indicate that said switching office has responded to a request for service from said subset, second means including said first means and operative in response to said service request indication from said subset to bid for seizure of said translating means, and third means controlled by said first and second means for releasing said first means and for inhibiting said second means.

2. In a telephone system, the combination according to claim 1 wherein said switching office comprises means for signaling said first means that a subsequent service request indication from said subset is not a request for service requiring the use of said translating means, and said first means comprises means for blocking the operation of said second means upon receipt of said signal.

3. In a telephone system, the combination according to claim 1 wherein said first means comprises a relay connected in said line and further comprising means responsive to a signal from said switching office for releasing said relay and said second means in sequence when the called party has answered.

4. A telephone system comprising a switching office responsive to first-type signals, a subset, a line circuit located at said switching office, a line connecting said subset to siad line circuit, means in said subset for applying second-type signals to said line and translating means for converting said second-type signals to corresponding first-type signals, switching means exclusively associated with said line, and means at said switching office responsive to a request for service by said subset for controlling said switching means to interpose said translating means in said line between said subset and said line circuit.

5. The combination according to claim 4 and further comprising a source of dial tone at said switching office, said switching means comprising means for receiving dial tone from said source and means for transmitting said dial tone from said receiving means to said subset only when said translating means has been seized.

6. In a telephone system the combination according to to claim 4 wherein said switching means comprises a plurality of relays, first means for operating a first one of said relays connected in said line to indicate that said central office has responded to a request for service from said subset, second means comprising said first relay and said subset for operating a second one of said relays to bid for seizure of said translating means, timing means and third means comprising said first and second relays and said timing means for operating a third one of said relays to release said first and second relays.

7. The combination according to claim 6, and further comprising means connectable in parallel with the operating winding of said first relay for bypassing said switching means.

8. The combination claimed in claim 6, and further comprising means including said third relay for restoring said switching means to normal in response to abandonment of a call prior to seizure of said translating means.

9. The combination according to claim 8 wherein said restoring means further comprises a first set of contacts on said first relay and a second set of contacts on said second relay for controlling said third relay.

10. In a telephone system, a switching office responsive to direct current signals, a subset including means for generating alternating current signals, a line connecting said subset to said switching office, a first relay having an operating winding in series with said line, means for operating said first relay when said set is to originate a call, means for preventing operation of said relay when said set is to receive a call, translator means for converting said alternating current signals to direct current signals, a second relay under control of said first relay and said subset and having contacts for interposing said translator between said subset and said switching office, and a third relay controlled by said first and second relays for releasing said first relay and inhibiting the operation of said second relay.

11. In a telephone system, the combination set forth in claim 10 further comprising a timing circuit for also controlling said third relay.

12. In a telephone system, the combination set forth in claim 10 wherein said preventing means comprises a diode in parallel with said first relay operating winding.

13. In a telephone system, the combination set forth in claim 10 further comprising means in said switching office for transmitting dial tone to said subset and means for causing said dial tone to be transmitted to said subscriber only after interposition of said translator.

14. In a telephone system, a switching office responsive to direct current signals and including means for generating dial tone, a subset including means for generating alternating current signals, a line connecting said subset to said switching office, translation equipment common to a plurality of subsets and including a translator for converting said alternating current signals to direct current signals and a timing circuit; translator control means individual to said subset and including a first relay having an operating winding in series with said line, a diode in parallel with said first relay operating winding for preventing operation of said relay when said subset is to receive a call, a second relay under control of said first relay and said subset and having contacts for interposing said translator between said line and said switching office, and a third relay controlled by said first and said second relays for releasing said first relay and inhibiting the operation of said second relay, said third relay being also responsive to said timing circuit; and means for causing dial tone to be transmitted to said subscriber only after interposition of said translator by said translator control means.

References Cited by the Examiner

UNITED STATES PATENTS

| | | | |
|---|---|---|---|
| 2,153,129 | 4/39 | Bascom | 179—18 |
| 2,300,951 | 11/42 | Malthaner | 179—25 |
| 2,327,275 | 8/43 | Lewis | 179—16 |
| 2,358,237 | 9/44 | Lewis et al. | 179—27 |

ROBERT H. ROSE, *Primary Examiner.*

WILLIAM C. COOPER, *Examiner.*